United States Patent
Madala et al.

(10) Patent No.: US 11,677,315 B2
(45) Date of Patent: Jun. 13, 2023

(54) LOAD ADAPTIVE SPREAD SPECTRUM MODULATION (SSM)

(71) Applicant: TEXAS INSTRUMENTS INCORPORATED, Dallas, TX (US)

(72) Inventors: Srinivasa Rao Madala, Prakasham (IN); Suvadip Banerjee, Bengaluru (IN); Sudhir Komarla Adinarayana, Bengaluru (IN); Tarunvir Singh, Jalandhar (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 255 days.

(21) Appl. No.: 17/103,176

(22) Filed: Nov. 24, 2020

(65) Prior Publication Data

US 2021/0376715 A1 Dec. 2, 2021

Related U.S. Application Data

(60) Provisional application No. 63/031,153, filed on May 28, 2020.

(51) Int. Cl.
*H02M 3/24* (2006.01)
*H02M 1/44* (2007.01)
*H02M 3/335* (2006.01)

(52) U.S. Cl.
CPC ............... *H02M 1/44* (2013.01); *H02M 3/24* (2013.01); *H02M 3/33515* (2013.01)

(58) Field of Classification Search
CPC ...... H02M 1/44; H02M 3/24; H02M 3/33515; H02M 1/0032
See application file for complete search history.

(56) References Cited

U.S. PATENT DOCUMENTS

| | | | | |
|---|---|---|---|---|
| 11,489,533 | B2* | 11/2022 | Matei | H02M 1/15 |
| 2015/0198966 | A1* | 7/2015 | Lee | G06F 1/324 |
| | | | | 713/501 |
| 2019/0238054 | A1* | 8/2019 | Flaibani | H02M 3/158 |
| 2021/0336626 | A1* | 10/2021 | Matei | H02M 1/15 |

* cited by examiner

*Primary Examiner* — Adolf D Berhane
*Assistant Examiner* — Afework S Demisse
(74) *Attorney, Agent, or Firm* — John R. Pessetto; Frank D. Cimino

(57) ABSTRACT

A system includes a switching converter, an input voltage source coupled to an input of the switching converter, and a load coupled to an output of the switching converter. The system also includes a load sense circuit coupled to the load and configured to provide a load sense signal. The system also includes an oscillator coupled to the switching converter and configured to provide a spread spectrum modulated (SSM) clock signal to the switching converter, wherein a frequency of the SSM clock signal varies as a function of the load sense signal.

21 Claims, 4 Drawing Sheets

LOAD ADAPTIVE SPREAD SPECTRUM MODULATION (SSM)

CROSS-REFERENCE TO RELATED APPLICATION

This application claim priority to U.S. Provisional Application No. 63/031,153, filed May 28, 2020, titled "Load Adaptive Spread Spectrum Modulation (SSM)," which is hereby incorporated herein by reference in its entirety.

BACKGROUND

The proliferation of electronic devices and integrated circuit (IC) technology has resulted in the commercialization of IC products. As new electronic devices are developed and IC technology advances, new IC products are commercialized. One example IC product that is needed in electronic devices is a switching converter. In one example switching converter, switches are turned on and off to maintain the output voltage (VOUT) above a target and to vary the output current as a function of load. The switching operations of such a switching converter generates electromagnetic interference (EMI) noise that is unacceptable for certain applications.

IC product development involves compliance with conducted emission and radiated emissions, which are critical system level specifications. Such compliance is demanded for many IC products developed for commercial applications such as industrial, power grid, automotive, medical system, and/or other commercial applications. Failing an electromagnetic compatibility (EMC) test causes time consuming debug and costly board/system/architecture redesign cycles for customers. EMI, in particular, is a major concern for switching converter customers. Peak, quasi-peak, and average measurements of emissions are three types of EMI measurements that are defined in standards. Some standards (e.g., CISPR25) require peak emissions compliance, which is the hardest of the three types of EMI measurements.

One strategy to reduce EMI is duty-cycling of pulse-width modulation (PWM). In duty-cycling of PWM, the PWM operations are turned on and off. Another strategy to deal with EMI is spread spectrum modulation (SSM). In SSM, the switching frequency for a switching converter is varied over time, resulting in the EMI noise being spread across a range of frequencies. Efforts to further reduce EMI noise are ongoing.

SUMMARY

In accordance with at least one example of the disclosure, a system comprises a switching converter, an input voltage source coupled to an input of the switching converter, and a load coupled to an output of the switching converter. The system also comprises a load sense circuit coupled to the load and configured to provide a load sense signal. The system also comprises an oscillator coupled to the switching converter and configured to provide a spread spectrum modulated (SSM) clock signal to the switching converter, wherein a frequency of the SSM clock signal varies as a function of the load sense signal.

In accordance with at least one example of the disclosure, an integrated circuit comprises a load sense circuit configured to provide a load sense signal. The integrated circuit also comprises a spread spectrum controller coupled to the load sense circuit, wherein the spread spectrum controller is configured to provide a control signal based on the load sense signal. The integrated circuit also comprises an oscillator coupled to the spread spectrum controller. The oscillator is configured to output a SSM clock signal based on the control signal.

In accordance with at least one example of the disclosure, a circuit comprises a switching converter and a load sense circuit coupled to an output of the switching converter. The circuit also comprises a spread spectrum controller coupled to the load sense circuit. The circuit also comprises an oscillator coupled to the spread spectrum controller and the switching converter, wherein the oscillator is configured to provide a SSM clock signal to the switching converter based on a control signal from the spread spectrum controller, and wherein the control signal is based on a load sense signal from the load sense circuit.

BRIEF DESCRIPTION OF THE DRAWINGS

For a detailed description of various examples, reference will now be made to the accompanying drawings in which.

DETAILED DESCRIPTION

Figure 1:
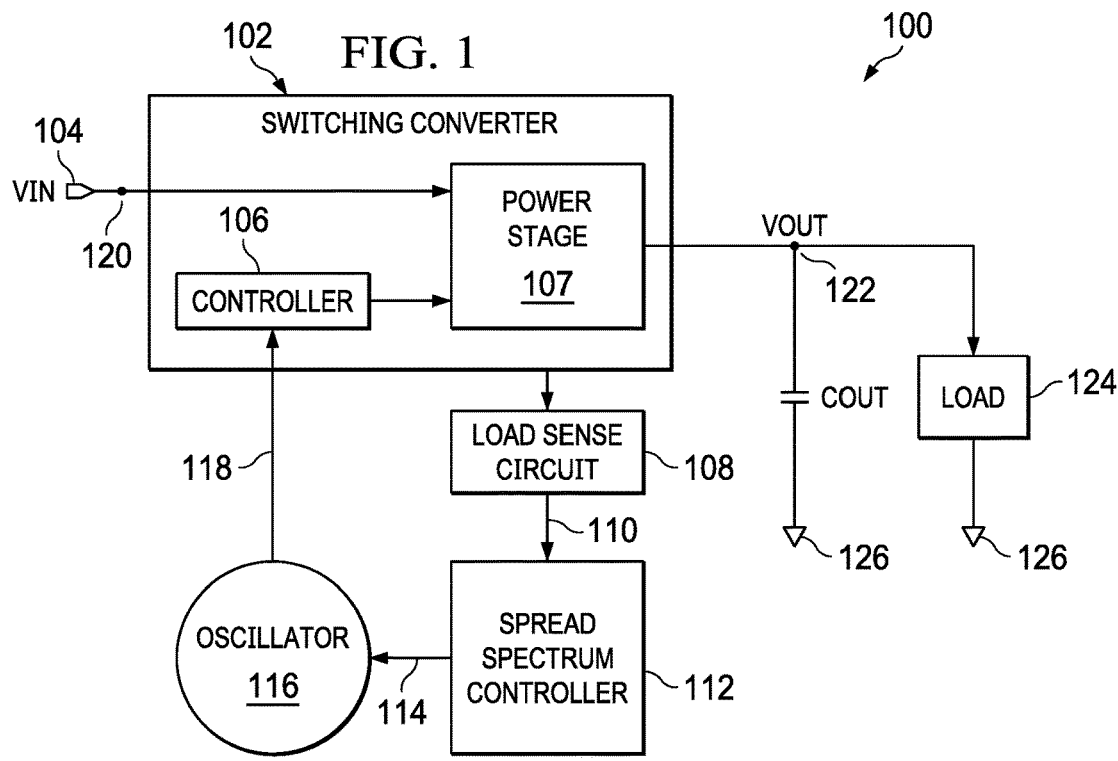
FIG. 1 is a block diagram showing a system in accordance with an example embodiment.

Disclosed herein is a load adaptive spread spectrum modulation (SSM) technique and related circuits and systems. In different example embodiments, the proposed load adaptive SSM technique is used with a switching converter (e.g., a buck converter, a boost converter, or a buck-boost converter). The proposed load adaptive SSM technique involves obtaining a load sense signal. In some example embodiments, the load sense signal is obtained by measuring or estimating a load current. In one example embodiment, a voltage divider and a comparator with a reference voltage are used to provide a load sense signal that indicates the load current is greater than a threshold. In other example embodiments, the load sense signal corresponds to a switch on-time (e.g., the duty-cycle of a high-side switch, or the duty-cycle of a low-side switch). In other example embodiments, the load sense signal is obtained from communications with a load (e.g., the load is able to provide data indicating a load or load schedule information).

The load sense signal is provided to a spread spectrum controller, which provides a control signal for an oscillator based on the load sense signal. In some example embodiments, the control signal is a voltage that varies as a function of the load sense signal. In one example embodiment, the spread spectrum controller uses the load sense signal to select one of a plurality of clock signals, where the selected clock signal is used to vary the value stored by a counter, and where the value stored by the counter is the control signal (e.g., for a digitally-controlled oscillator (DCO)). In at least some example embodiments, the control signal from the spread spectrum controller is used to set a frequency of an SSM clock signal (e.g., provided by an oscillator) to a predetermined resolution bandwidth (RBW) when the load sense signal indicates a pulse width modulation (PWM) on-time is at a target level (e.g., 100%). Also, in at least some example embodiments, the control signal from the spread spectrum controller is used to set a period of the SSM clock signal at k/RBW when the load sense signal indicates the PWM on-time is below the target level, where k is a constant (e.g., preferably k~1). Also, in at least some example embodiments, the control signal from the spread spectrum controller is used to vary a frequency of the SSM clock signal when the load sense signal indicates the PWM on-time is below the target level. In at least some example embodiments, the control signal from the spread spectrum controller is used to vary the frequency of the SSM clock signal such that the frequency of the SSM clock signal is inversely proportional to the PWM on-time when the load sense signal indicates the PWM on-time is below the target level. In at least some example embodiments, the control signal from the spread spectrum controller is used to vary the frequency of the SSM clock signal such that the frequency of the SSM clock signal traverses the entire SSM depth in the PWM on-time only once in a period of 1/RWB.

With the proposed load adaptive SSM technique, electromagnetic interference (EMI) noise is reduced for lower load conditions compared to conventional PWM and/or SSM techniques. In some switching converter systems, a lower load condition (e.g., a 10-50% duty-cycle) is the target application, which means the load adaptive SSM technique will provide a consistent advantage with regard to EMI noise compared to conventional PWM and/or SSM techniques. To provide a better understanding, various load adaptive SSM options and related circuits or systems are described using the figures as follows.

FIG. 1 is a block diagram showing a system 100 in accordance with an example embodiment. As shown, the system 100 includes a switching converter 102 (e.g., a DC-DC converter) between an input voltage (VIN) node 120 and an output voltage (VOUT) node 122. The VIN node 120 is coupled to a VIN source 104. The VOUT node 122 is coupled to a load 124 in parallel with an output capacitor (COUT) relative to a ground node 126. In the example of FIG. 1, the switching converter 102 includes a controller 106 and a power stage 107. In different examples, the power stage 107 has a buck topology, a boost topology, or a buck-boost topology. Also, in different example embodiments, the power stage 107 may have an isolated power topology (e.g., using a transformer or other isolation option) a non-isolated power topology.

In the example of FIG. 1, the controller 106 of the switching converter 102 is coupled to an oscillator 116 and the operations of the switching converter 102 are a function of a SSM clock signal 118 provided by the oscillator 116. As shown, the oscillator 116 is coupled to a spread spectrum controller 112 configured to provide a control signal 114 to the oscillator 116. Thus, the SSM clock signal 118 output by the oscillator 116 is based on the control signal 114 provided by the spread spectrum controller 112. Also, the spread spectrum controller 112 is coupled to a load sense circuit 108 configured to provide a load sense signal 110 to the spread spectrum controller 112. Thus, the control signal 114 output by the spread spectrum controller 112 is a function of the load sense signal 110 provided by the load sense circuit 108.

In some example embodiments, the load sense circuit 108 is configured to detect the on-time (the amount or percentage of time that the high-side switch is turned on) or the duty-cycle of the switching converter 102. In one example, the load sense circuit 108 receives an on-time signal ($t_{on}$) from the controller 106 of the switching converter 102. In this example, the load sense circuit 108 includes a counter that counts up while $t_{on}$ is high, and the count stored by the counter corresponds to the load sense signal 110. In other example embodiments, the load sense circuit 108 is configured to detect a load current output to the VOUT node 122, or when the load current is greater than a threshold. In either case, the load sense circuit 108 is configured to provide the load sense signal 110 to the spread spectrum controller 112, where the load sense signal 110 provides an indication of the load, which changes over time.

The spread spectrum controller 112 uses the load sense signal 110 to determine the control signal 114. In some example embodiments, the control signal 114 is a voltage that varies as a function of the load sense signal 110. In other example embodiments, the control signal 114 is a digital value that varies as a function of the load sense signal 110. In at least some example embodiments, the control signal 114 is used to set a frequency of the SSM clock signal 118 output by the oscillator 116. In different example embodiments, the oscillator is a voltage controlled oscillator (VCO) or a DCO. In one example embodiment, the control signal 114 sets the frequency SSM clock signal 118 to a predetermined RBW when the load sense signal 110 indicates the load is at a target level (e.g., the PWM on-time is at 100%). Also, in at least some example embodiments, the control signal 114 is used to set a period of the SSM clock signal 118 at k/RBW when the load sense signal 110 indicates the load is below the target level (e.g., the PWM on-time is below 100%), where k is a constant (e.g., preferably k~1).

Also, in at least some example embodiments, the control signal 114 is used to vary a frequency of the SSM clock signal 118 when the load sense signal 110 indicates the load is below the target level (e.g., the PWM on-time is below 100%). In at least some example embodiments, the control signal 114 is used to vary the frequency of the SSM clock signal 118 such that the frequency of the SSM clock signal 118 is inversely proportional to the PWM on-time when the load sense signal 110 indicates the load is below the target level. In at least some example embodiments, the control signal 114 is used to vary the frequency of the SSM clock signal 118 such that the frequency of the SSM clock signal 118 traverses the entire SSM depth in the PWM on-time only once in a period of 1/RWB.

With the proposed load adaptive SSM technique, the benefit of spread spectrum modulation and pulse width modulation is achieved for a switching emissions source. When the load or on-time is at a target value (e.g., a maximum load or 100% on-time or duty-cycle), the spread spectrum modulation frequency ($f_{ssm}$) is set as RBW (the same as a conventional SSM technique). For load or on-time values below the target value, the period is made constant at k/RBW, where k is a constant (e.g., k~1). For load or on-time values below the target value, the spread spectrum modulation frequency ($f_{ssm}$) is varied and is inversely proportional to the on-time ($t_{on}$). In other words, $$f_{ssm} \propto \frac{1}{t_{on}}.$$

In some example embodiments, the entire SSM depth is traversed in the available ON time only once in a period of 1/RBW.

In different example embodiments, the arrangement of the components represented for the system 100 of FIG. 1 vary.

In one example embodiment, the switching converter 102, the load sense circuit 108, the spread spectrum controller 112, and the oscillator 116 are part of a single integrated circuit (IC). In another example embodiment, the controller 106 of the switching converter 102, the load sense circuit 108, the spread spectrum controller 112, and the oscillator 116 are part of a first IC, while the power stage 107 of the switching converter 102 are part of a second IC. In another example embodiment, the load sense circuit 108, the spread spectrum controller 112, and the oscillator 116 are part of a first IC, while the switching converter 102 is part of at least one other IC.

Figure 2:
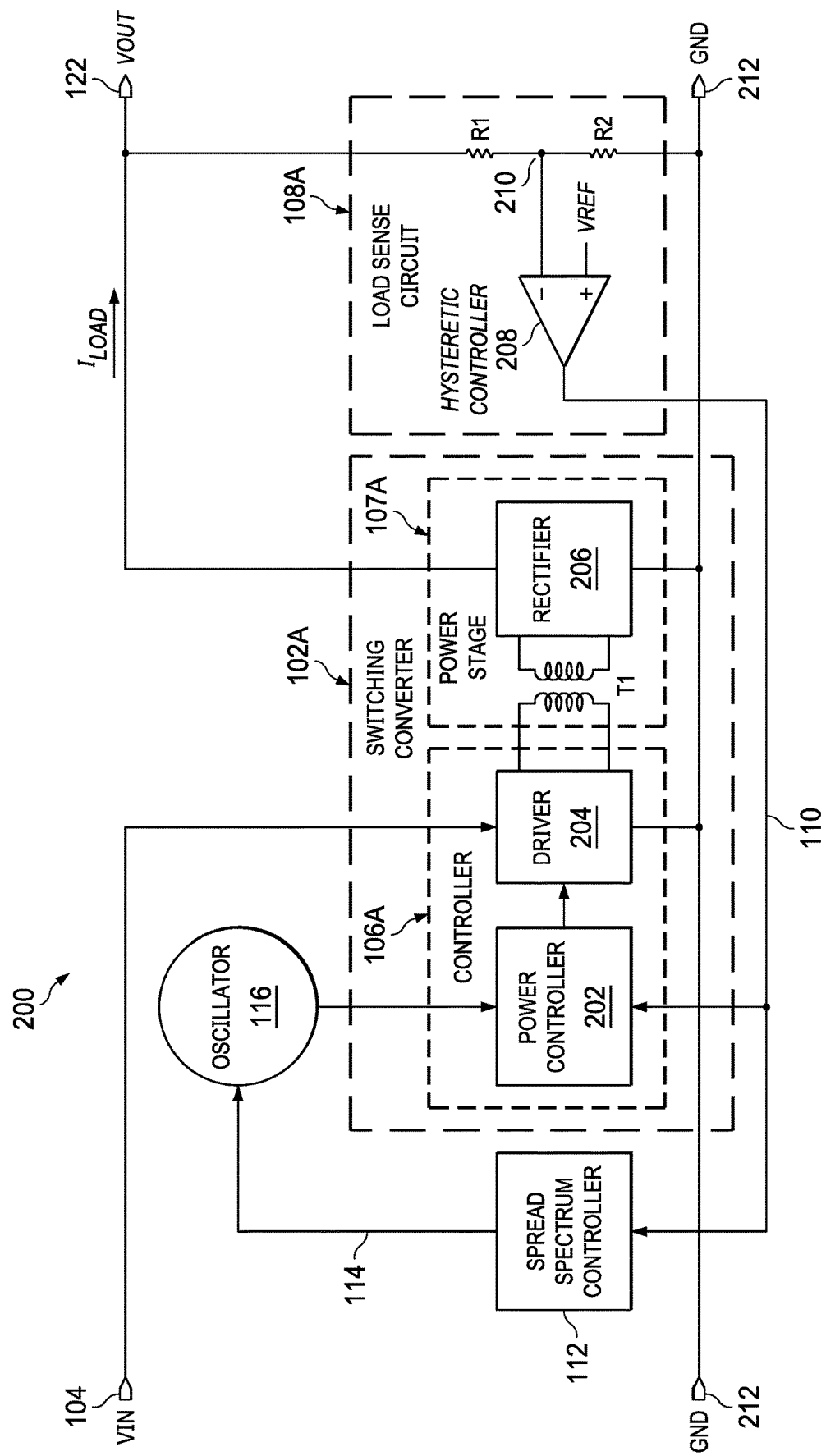
FIG. 2 is a block diagram showing a power regulation circuit in accordance with an example embodiment.

FIG. 2 is a block diagram showing a power regulation circuit 200 in accordance with an example embodiment. As shown, the power regulation circuit 200 includes a switching converter 102A (an example of the switching converter 102 in FIG. 1) and related control components, such as the spread spectrum controller 112, the oscillator 116, and a load sense circuit 108A (an example of the load sense circuit 108 in FIG. 1). In the example of FIG. 2, the switching converter 102A includes a power controller 202 coupled to a driver 204, where the power controller 202 and the driver 204 correspond to components of a controller 106A (an example of the controller 106 in FIG. 1). In operation, the power controller 202 selects control signals for the driver 204 based on the load sense signal 110 from the load sense circuit 108A and based on an SSM clock signal from the oscillator 116. The driver 204 produces pulses based on the control signals from the power controller 202 to regulator power to the output node 122. More specifically, in the example of FIG. 2, the switching converter 102A includes a power stage 107A (an example of the power stage 107 in FIG. 1) with a transformer (T1) having a primary coil coupled to the driver 204 and having a secondary coil coupled to a rectifier 206. The output of the rectifier 206 is coupled to the output node 122. With T1 and the rectifier 206, the power stage 107A of the switching converter 102A corresponds to an isolated power topology. In other example embodiments, a different isolated power topology or a non-isolated power topology is used for the power stage 107A.

As shown, the power regulation circuit 200 includes the spread spectrum controller 112 described in FIG. 1, which is configured to provide a control signal 114 to the oscillator 116 based on a load sense signal 110 from the load sense circuit 108A. In one example embodiment, the control signal 114 is a voltage and the oscillator is a VCO. In another example embodiment, the control signal 114 is a digital signal and the oscillator is a DCO. In the example of FIG. 2, the load sense circuit 108A includes a voltage divider formed using R1 and R2 in series between the output node 122 and a ground node 212 (an example of the ground node 126 in FIG. 1). The load sense circuit 108A also includes comparator or hysteretic controller 208 with a first input coupled to a node 210 between R1 and R2 and with a second input configured to receive reference voltage (VREF). With the load sense circuit 108A, the comparator or hysteretic controller 208 provides an output signal that indicates when the voltage at the output node 122 is greater than or less than a threshold value (based on the values of R1, R2, and VREF).

In operation, the load sense circuit 108A generates a PWM signal (the load sense signal 110) with a duty cycle that is proportional to the load current ($I_{LOAD}$). The PWM signal from the load sense circuit 108A is fed to the spread spectrum controller 112. In some example embodiments, the spread spectrum controller 112 is configured to measure a window-averaged duty cycle of the load sense signal 110 and change the frequency of the SSM clock signal appropriately. For low duty cycle (on-time below a threshold), the frequency of the SSM clock signal is made high. For high duty cycle (on-time equal to or above a threshold), the frequency of the SSM clock signal is made low.

In one example embodiment, the spread spectrum controller uses the load sense signal 110 to select one of a plurality of clock signals, where the selected clock signal is used to vary the value stored by a counter, and where the value stored by the counter is the control signal 114 (e.g., for a DCO). In at least some example embodiments, the control signal from the spread spectrum controller is used to set a frequency of an SSM clock signal (e.g., provided by the oscillator 116) to a predetermined RBW when the load sense signal 110 indicates a load condition above a target (e.g., the PWM on-time is at a target level such as 100%). Also, in at least some example embodiments, the control signal 114 from the spread spectrum controller 112 is used to set a period of the SSM clock signal output from the oscillator 116 at k/RBW when the load sense signal 110 indicates a load condition below a target level (e.g., the PWM on-time is below a target level, where k is a constant, and where preferably k~1). Also, in at least some example embodiments, the control signal 114 from the spread spectrum controller 112 is used to vary a frequency of the SSM clock signal from the oscillator 116 when the load sense signal 110 indicates a load condition below a target level (e.g., the PWM on-time is below a target level). In at least some example embodiments, the control signal 114 from the spread spectrum controller 112 is used to vary the frequency of the SSM clock signal from the oscillator 116 such that the frequency of the SSM clock signal is inversely proportional to the PWM on-time when the load sense signal indicates a load condition below a target level (e.g., the PWM on-time is below a target level). In at least some example embodiments, the control signal 114 from the spread spectrum controller 112 is used to vary the frequency of the SSM clock signal from the oscillator 116 such that the frequency of the SSM clock signal traverses the entire SSM depth in the PWM on-time only once in a period of 1/RWB.

In different example embodiments, the arrangement of the components represented for the power regulation circuit 200 of FIG. 2 vary. In one example embodiment, the switching converter 102A, the load sense circuit 108A, the spread spectrum controller 112, and the oscillator 116 are part of a single IC. In another example embodiment, the controller 106A of the switching converter 102A, the load sense circuit 108A, the spread spectrum controller 112, and the oscillator 116 are part of a first IC, while the power stage 107A of the switching converter 102A are part of a second IC. In another example embodiment, the load sense circuit 108A, the spread spectrum controller 112, and the oscillator 116 are part of a first IC, while the switching converter 102A is part of at least one other IC.

Figure 3:
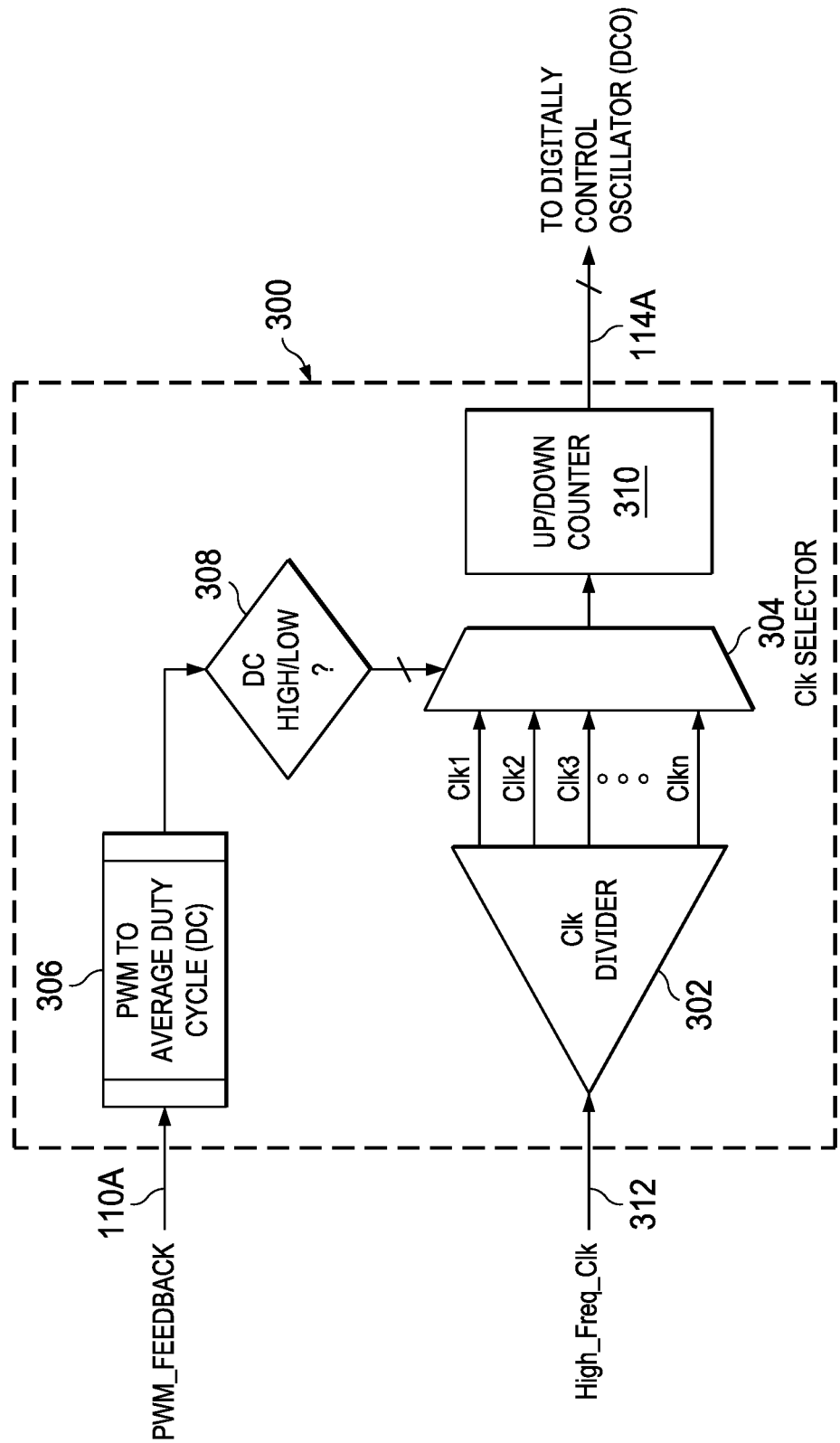
FIG. 3 is a block diagram showing a spread spectrum controller in accordance with an example embodiment.

FIG. 3 is a block diagram showing a spread spectrum controller 300 (an example of the spread spectrum controller 112 in FIGS. 1 and 2 in accordance with an example embodiment. In the example embodiment of FIG. 3, the spread spectrum controller 300 includes a clock divider 302, a clock selector 304, a PWM to average duty cycle block 306, a duty cycle high/low decision block 308, and an up/down counter 310. More specifically, the PWM to average duty cycle block 306 is configured to receive a load sense signal 110A (an example of the load sense signal 110 in FIGS. 1 and 2) in the form of PWM feedback signal (PWM_Feedback) that indicates a PWM on-time. The PWM to average duty cycle block 306 converts PWM feedback signal to an average duty cycle. At decision block 308, the average duty cycle value output from the PWM to average duty cycle block 306 is analyzed. If the average duty cycle is high (e.g., equal to or above a threshold), the decision block 308 outputs a first select signal to the clock selector 304. If the average duty cycle is not high (e.g., below the threshold), the decision block 308 outputs a second select signal the clock selector 304. In the example of FIG. 3, the selectable clock options for the clock selector 304 are provided by the clock divider 302, which generates a plurality of clock signals (Clk1-Clkn) from a high frequency clock signal (High_Freq_Clk) 312. The output of the clock selector 304 is provided to the up/down counter 310, which maintains a value based on the clock signal output from the clock selector 304. The output of the up/down counter 310 is provided as a control signal 114A (an example of the control signal 114 in FIGS. 1 and 2) to a DCO. In some examples, the spread spectrum controller 300 is implemented using a digital signal processor (DSP) and related components.

Figure 4A:
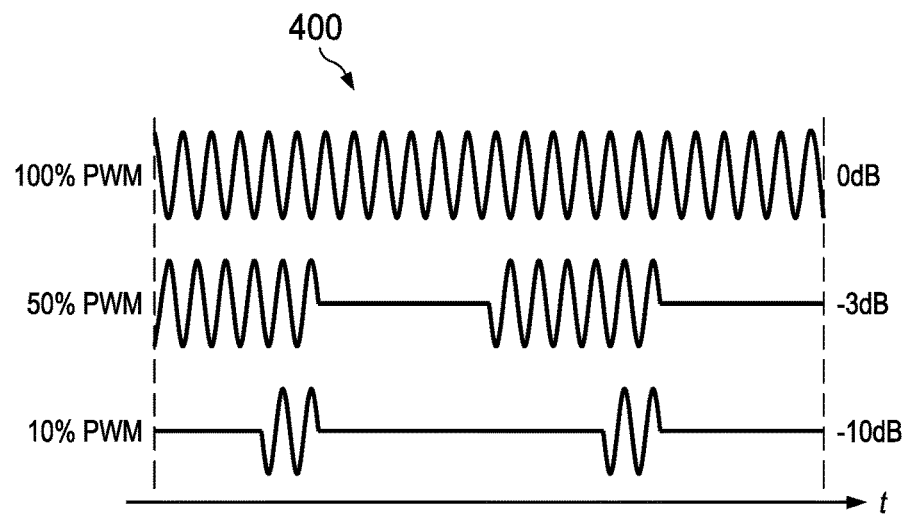
FIG. 4A is a graph showing pulse width modulation (PWM) waveforms as a function of time.

The proposed load adaptive SSM technique is an improvement over PWM and SSM options. FIG. 4A is a graph 400 showing PWM waveforms as a function of time. In graph 400, the 100% PWM waveform represents a PWM signal that is continuously active, the 50% PWM waveform represents a PWM signal that is active 50% of the time, and the 10% PWM waveform represents a PWM signal that is active 10% of the time. The low pass nature of RBW allows EMI scaling with duty-cycle as long as $f_{pwm} \geq RBW$. This is especially useful for scenarios where the noise source can be switched off (e.g., low load conditions in a DC-DC converter application).

Figure 4B:
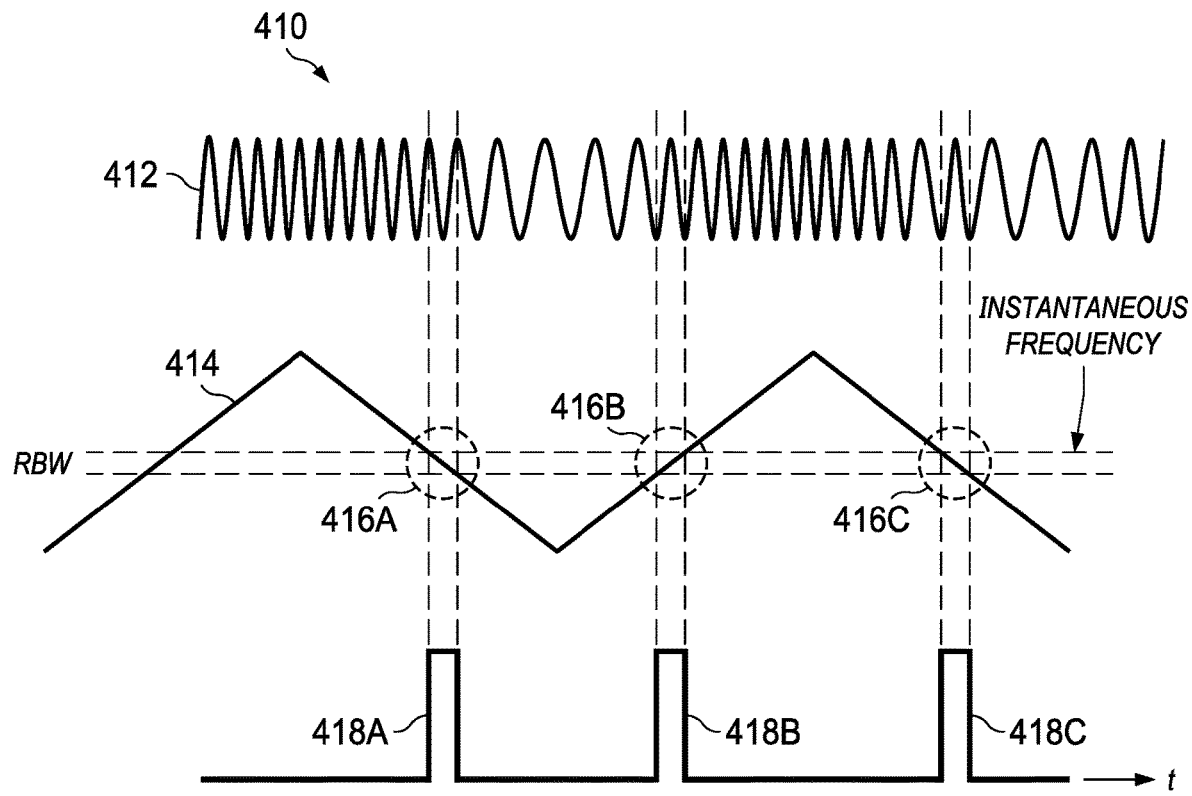
FIG. 4B is a graph showing an spread spectrum modulation (SSM) waveform as a function of time.

FIG. 4B is a graph 410 showing a SSM waveform 412 as a function of time. In graph 410, the frequency of the SSM waveform 412 varies as a function of time. To control the frequency of the SSM waveform 412, a control signal 414 is used, where the value of the control signal 414 varies over time. In the example of FIG. 4B, the control signal 414 ramps up and down around instantaneous frequencies corresponding to RBW. When the control signal 414 crosses the instantaneous frequencies corresponding to RBW at intersections 416A-416C, respective pulses 418A-418C are generated signaling each crossing event. Use of a SSM waveform such as the SSM waveform 412 allows for distribution of the radiated noise across multiple RBWs, staying in each RBW for less time. The theoretical maximum improvement that can be achieved by SSM is $$10\log_{10}\left(\frac{2 \cdot \Delta f}{RBW}\right).$$

Figure 5:
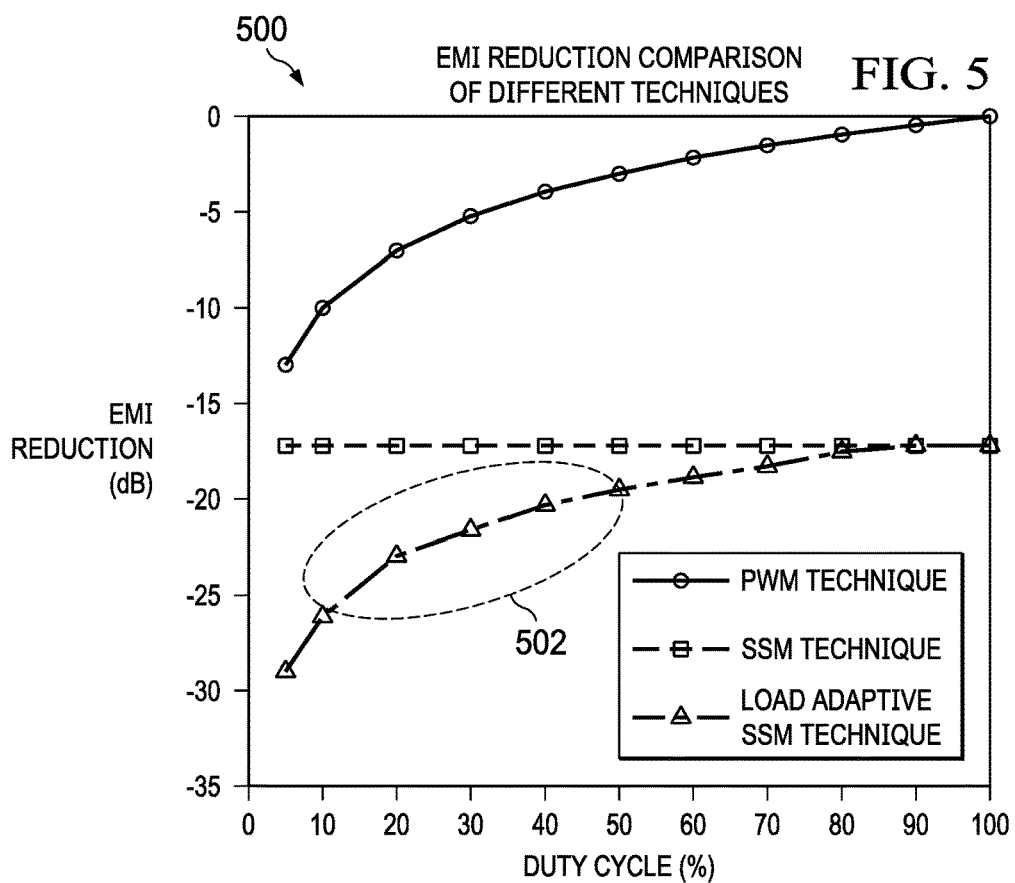
FIG. 5 is a graph showing electromagnetic interference (EMI) reduction as a function of duty-cycle for different control techniques.

FIG. 5 is a graph 500 showing EMI reduction as a function of duty-cycle for different control techniques. As shown in graph 500, use of a PWM technique (see e.g., graph 400 in FIG. 4A) reduces EMI as the duty-cycle is reduced as represented with the respective PWM technique curve. Also, use of a SSM technique (see e.g., graph 410 in FIG. 4B) further reduces EMI compared to the PWM technique, where the EMI reduction using the SSM technique is the same regardless of the duty-cycle as represented with the respective SSM technique curve. Use of a load adaptive SSM technique as proposed herein further reduces EMI compared to the PWM and SSM techniques. As shown, the EMI reduction using the load adaptive SSM technique reduced EMI as the duty-cycle is reduced as represented with the respective load adaptive SSM technique curve. Also, area 502 shows a duty-cycle range that corresponds with most customer use cases, indicating that the proposed load adaptive SSM technique is beneficial in most cases.

In some example embodiments, a system (e.g., the system 100 in FIG. 1) includes a switching converter (e.g., the switching converter 102 in FIG. 1 or the switching converter 102A in FIG. 2) and an input voltage source (e.g., the VIN source 104 in FIG. 1) coupled to an input of the switching converter. The system also includes a load (e.g., the load 124 in FIG. 1) coupled to an output of the switching converter. The system also includes a load sense circuit (e.g., the load sense circuit 108 in FIG. 1, or the load sense circuit 108A in FIG. 2) coupled to the load and configured to provide a load sense signal (e.g., the load sense signal 110 in FIG. 1 or 2, or the load sense signal 110A in FIG. 3). The system also includes an oscillator (e.g., the oscillator 116 in FIG. 1 or 2) coupled to the switching converter and configured to provide a SSM clock signal (e.g., the SSM clock signal 118 in FIG. 1) to the switching converter, wherein a frequency of the SSM clock signal varies as a function of the load sense signal.

In some example embodiments, the system also includes a spread spectrum controller (e.g., the spread spectrum controller 112 in FIG. 1 or 2, or the spread spectrum controller 300 in FIG. 3) coupled to the load sense circuit and the oscillator, wherein the spread spectrum controller is configured to provide a control signal (e.g., the control signal 114 in FIG. 1 or 2, or the control signal 114A in FIG. 3) to the oscillator based on the load sense signal, resulting in the SSM clock signal. In some example embodiments, the spread spectrum controller includes: a clock selector (e.g., the clock selector 304 in FIG. 3) configured to select one a plurality of different clock signals in accordance with the load sense signal; and a counter (e.g., the up/down counter 310) coupled to an output of the clock selector, where the counter stores a value that determines a frequency of the SSM clock signal. In some example embodiments, the control signal is configured to set a frequency of the SSM clock signal to a predetermined RBW when the load sense signal indicates a load is at a target level. The system of claim 4, wherein the target level is a maximum load (e.g., 100% duty-cycle or 100% PWM on-time). In some example embodiments, the control signal is configured to set a period of the SSM clock signal at k/RBW when the load sense signal indicates the load is below the target level, where k is a constant. In some example embodiments, k is approximately equal to 1. In some example embodiments, the control signal is configured to vary a frequency of the SSM clock signal when the load sense signal indicates the load is below the target level. In some example embodiments, the frequency of the SSM clock signal is inversely proportional to the PWM on-time when the load sense signal indicates the load is below the target level. In some example embodiments, the control signal is configured to vary the frequency of the SSM clock signal such that the frequency of the SSM clock signal traverses the entire SSM depth in the PWM on-time only once in a period of 1/RWB.

In some examples, an integrated circuit includes a load sense circuit (e.g., the load sense circuit 108 in FIG. 1, or the load sense circuit 108A in FIG. 2) configured to provide a load sense signal (e.g., the load sense signal 110 in FIG. 1 or 2, or the load sense signal 110A in FIG. 3). The integrated circuit also includes a spread spectrum controller (e.g., the spread spectrum controller 112 in FIG. 1 or 2, or the spread spectrum controller 300 in FIG. 3) coupled to the load sense circuit, wherein the spread spectrum controller is configured to provide a control signal (e.g., the control signal 114 in FIG. 1 or 2, or the control signal 114A in FIG. 3) based on the load sense signal. The integrated circuit also includes an oscillator (e.g., the oscillator 116 in FIG. 1) coupled to the spread spectrum controller, wherein the oscillator is configured to output a SSM clock signal (e.g., the SSM clock signal 118 in FIG. 1) based on the control signal.

In some example embodiments, the control signal is configured to set a frequency of the SSM clock signal to a predetermined RBW when the load sense signal indicates a PWM on-time is at a target level (e.g., 100%). In some example embodiments, the control signal is configured to set a period of the SSM clock signal at k/RBW when the load sense signal indicates the PWM on-time is below the target level, where k is a constant. In some example embodiments, the control signal is configured to vary a frequency of the SSM clock signal such that the frequency of the SSM clock signal is inversely proportional to the PWM on-time when the load sense signal indicates the PWM on-time is below the target level. In some example embodiments, the control signal is configured to vary the frequency of the SSM clock signal such that the frequency of the SSM clock signal traverses the entire SSM depth in the PWM on-time only once in a period of 1/RWB.

In some example embodiments, a circuit (e.g., a power regulation circuit 200 as in FIG. 2, or components of the system 100 in FIG. 1) includes a switching converter (e.g., the switching converter 102 in FIG. 1, or the switching converter 102A in FIG. 2) and a load sense circuit (e.g., the load sense circuit 108 in FIG. 1, or the load sense circuit 108A in FIG. 2) coupled to an output of the switching converter. The circuit also includes a spread spectrum controller (e.g., the spread spectrum controller 112 in FIG. 1 or 2) coupled to the load sense circuit. The circuit also includes an oscillator (e.g., the oscillator 116 in FIG. 1 or 2) coupled to the spread spectrum controller and the switching converter, where the oscillator is configured to provide a SSM clock signal (e.g., the SSM clock signal 118 in FIG. 1) to the switching converter based on a control signal from the spread spectrum controller, and wherein the control signal is based on a load sense signal from the load sense circuit.

In some example embodiments, the spread spectrum controller is configured to provide the control signal (e.g., the control signal 114 in FIG. 1 or 2, or the control signal 114A in FIG. 3) to set a frequency of the SSM clock signal to a predetermined RBW when the load sense signal indicates a PWM on-time is at a target level. In some example embodiments, the spread spectrum controller is configured to provide the control signal to set a period of the SSM clock signal at k/RBW when the load sense signal indicates the PWM on-time is below the target level, where k is a constant. In some example embodiments, the spread spectrum controller is configured to provide the control signal to vary a frequency of the SSM clock signal such that the frequency of the SSM clock signal is inversely proportional to the PWM on-time when the load sense signal indicates the PWM on-time is below the target level. In some example embodiments, the spread spectrum controller is configured to provide the control signal to vary the frequency of the SSM clock signal such that the frequency of the SSM clock signal traverses the entire SSM depth in the PWM on-time only once in a period of 1/RWB.

Certain terms have been used throughout this description and claims to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ."

The term "couple" is used throughout the specification. The term may cover connections, communications, or signal paths that enable a functional relationship consistent with the description of the present disclosure. For example, if device A generates a signal to control device B to perform an action, in a first example device A is coupled to device B by direct connection, or in a second example device A is coupled to device B through intervening component C if intervening component C does not alter the functional relationship between device A and device B such that device B is controlled by device A via the control signal generated by device A.

The above discussion is meant to be illustrative of the principles and various embodiments of the present invention. Numerous variations and modifications will become apparent to those skilled in the art once the above disclosure is fully appreciated.

What is claimed is:

1. A system, comprising:
a switching converter;
an input voltage source coupled to an input of the switching converter;
a load sense circuit configured to provide a load sense signal;
an oscillator coupled to the switching converter and configured to provide a spread spectrum modulated (SSM) clock signal to the switching converter, wherein a frequency of the SSM clock signal varies as a function of the load sense signal.

2. The system of claim 1, further comprising a spread spectrum controller coupled to the load sense circuit and the oscillator, wherein the spread spectrum controller is configured to provide a control signal to the oscillator based on the load sense signal, resulting in the SSM clock signal.

3. The system of claim 2, wherein the spread spectrum controller includes:
a clock selector configured to select one a plurality of different clock signals in accordance with the load sense signal; and
a counter coupled to an output of the clock selector, wherein the counter stores a value that determines a frequency of the SSM clock signal.

4. The system of claim 2, wherein the control signal is configured to set a frequency of the SSM clock signal to a predetermined resolution bandwidth (RBW) when the load sense signal indicates a load is at a target level.

5. The system of claim 4, wherein the target level is a maximum load.

6. The system of claim 4, wherein the control signal is configured to set a period of the SSM clock signal at k/RBW when the load sense signal indicates the load is below the target level, where k is a constant.

7. The system of claim 6, wherein k is approximately equal to 1.

8. The system of claim 4, wherein the control signal is configured to vary a frequency of the SSM clock signal when the load sense signal indicates the load is below the target level.

9. The system of claim 8, wherein the frequency of the SSM clock signal is inversely proportional to a pulse width modulation (PWM) on-time when the load sense signal indicates the load is below the target level.

10. The system of claim 9, wherein the control signal is configured to vary the frequency of the SSM clock signal such that the frequency of the SSM clock signal traverses the entire SSM depth in the PWM on-time only once in a period of 1/RWB.

11. An integrated circuit, comprising:
a load sense circuit configured to provide a load sense signal;
a spread spectrum controller coupled to the load sense circuit, wherein the spread spectrum controller is configured to provide a control signal based on the load sense signal; and
an oscillator coupled to the spread spectrum controller, wherein the oscillator is configured to output a spread spectrum modulated (SSM) clock signal based on the control signal.

12. The integrated circuit of claim 11, wherein the control signal is configured to set a frequency of the SSM clock signal to a predetermined resolution bandwidth (RBW) when the load sense signal indicates a pulse width modulation (PWM) on-time is at a target level.

13. The integrated circuit of claim 12, wherein the target level is 100%.

14. The integrated circuit of claim 12, wherein the control signal is configured to set a period of the SSM clock signal at k/RBW when the load sense signal indicates the PWM on-time is below the target level, where k is a constant.

15. The integrated circuit of claim 12, wherein the control signal is configured to vary a frequency of the SSM clock signal such that the frequency of the SSM clock signal is inversely proportional to the PWM on-time when the load sense signal indicates the PWM on-time is below the target level.

16. The integrated circuit of claim 15, wherein the control signal is configured to vary the frequency of the SSM clock signal such that the frequency of the SSM clock signal traverses the entire SSM depth in the PWM on-time only once in a period of 1/RWB.

17. A circuit, comprising:
a switching converter;
a load sense circuit coupled to an output of the switching converter;
a spread spectrum controller coupled to the load sense circuit;
an oscillator coupled to the spread spectrum controller and the switching converter, wherein the oscillator is configured to provide a spread spectrum modulated (SSM) clock signal to the switching converter based on a control signal from the spread spectrum controller, and wherein the control signal is based on a load sense signal from the load sense circuit.

18. The circuit of claim 17, wherein the spread spectrum controller is configured to provide the control signal to set a frequency of the SSM clock signal to a predetermined resolution bandwidth (RBW) when the load sense signal indicates a pulse width modulation (PWM) on-time is at a target level.

19. The circuit of claim 18, wherein the spread spectrum controller is configured to provide the control signal to set a period of the SSM clock signal at k/RBW when the load sense signal indicates the PWM on-time is below the target level, where k is a constant.

20. The circuit of claim 19, wherein the spread spectrum controller is configured to provide the control signal to vary a frequency of the SSM clock signal such that the frequency of the SSM clock signal is inversely proportional to the PWM on-time when the load sense signal indicates the PWM on-time is below the target level.

21. The circuit of claim 20, wherein the spread spectrum controller is configured to provide the control signal to vary the frequency of the SSM clock signal such that the frequency of the SSM clock signal traverses the entire SSM depth in the PWM on-time only once in a period of 1/RWB.

* * * * *